UNITED STATES PATENT OFFICE.

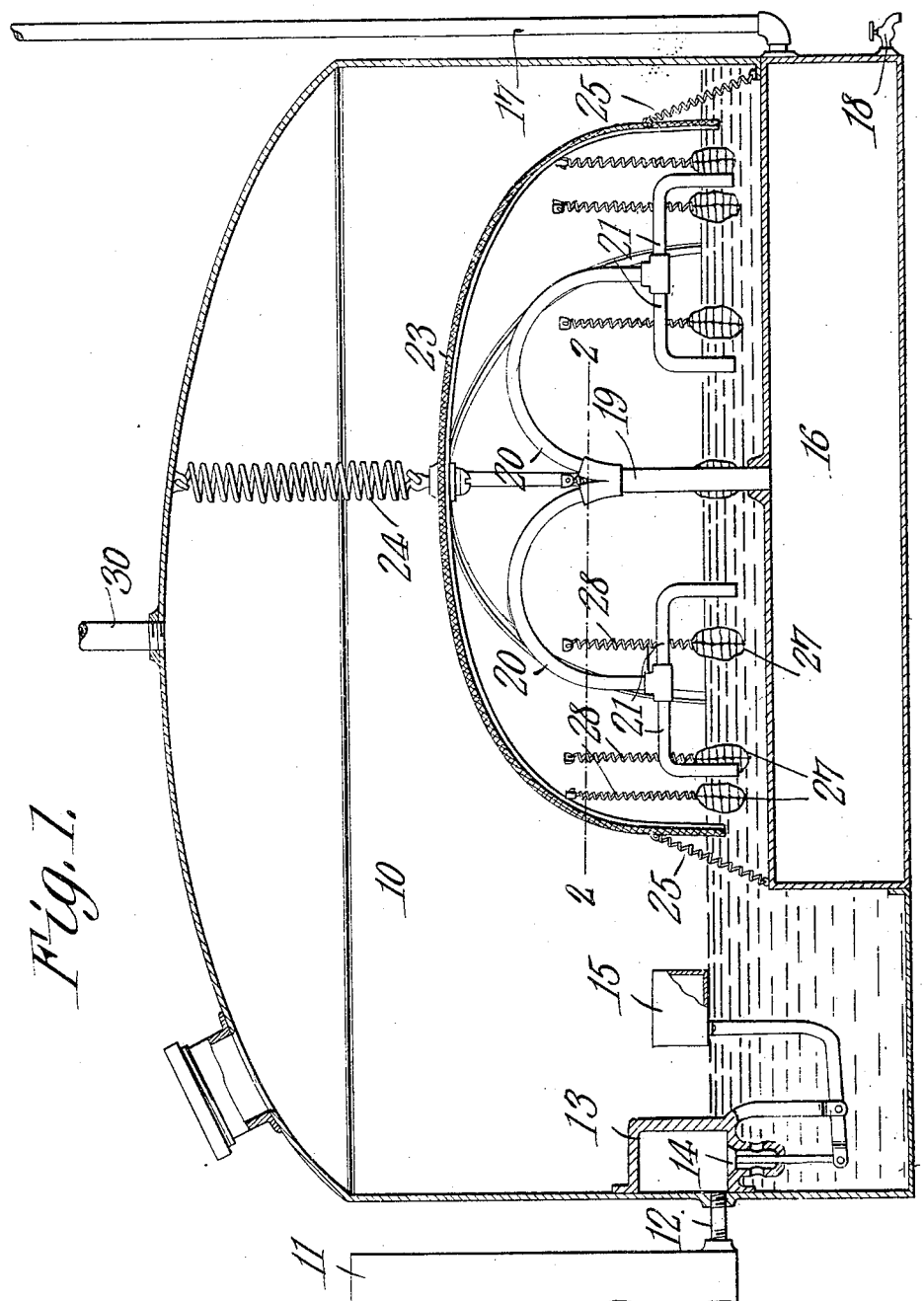

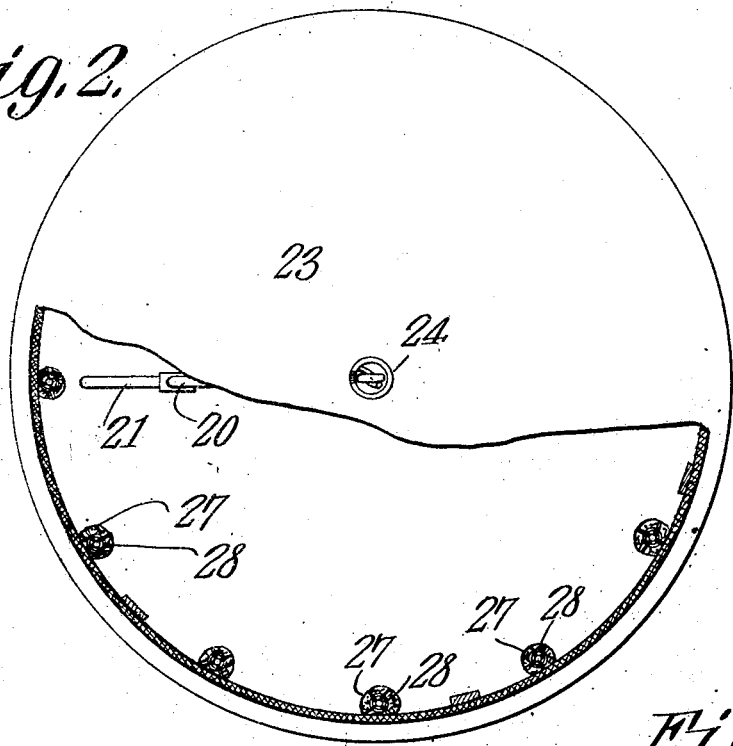
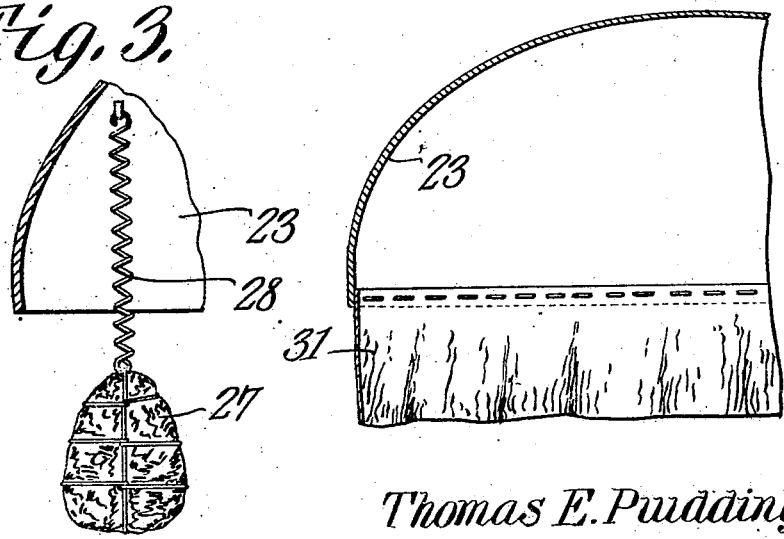

THOMAS E. PUDDINGTON, OF HAMPDEN, MAINE.

CARBURETER.

No. 886,403.  Specification of Letters Patent.  Patented May 5, 1908.

Application filed March 7, 1907. Serial No. 361,086.

*To all whom it may concern:*

Be it known that I, THOMAS E. PUDDINGTON, a citizen of the United States, residing at Hampden, in the county of Penobscot and State of Maine, have invented a new and useful Carbureter, of which the following is a specification.

This invention relates to carbureters, and has for its principal object to provide a mechanism of novel construction, whereby air may be saturated with a hydrocarbon in order to form an illuminating or heating gas, or ordinary gas as supplied to houses or other buildings may be enriched in carbon in order to increase the candle power.

A further object of the invention is to provide a device of this class in which the fluid to be carbureted serves as a means for agitating one or more absorbent members that are saturated with the carbureting liquid.

A still further object of the invention is to provide a device of this class in which one or more absorbent members are supported on a freely movable carrier arranged in the path of the current of fluid, and so disposed that when agitated the absorbent members will be moved partly into and from the carbureting liquid.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of construction may be made without departing from the spirit or sacrificing any of the advantages of the invention.

In the accompanying drawings:—Figure 1 is a sectional elevation of a carbureter constructed in accordance with the invention. Fig. 2 is a sectional plan view of a portion of the same on the line 2—2 of Fig. 1. Fig. 3 is a detail section on an enlarged scale of one of the absorbent members and its carrier. Fig. 4 is a view similar to Fig. 3 illustrating a slight modification of the invention.

Similar numerals of reference are employed to indicate corresponding parts throughout the several figures of the drawings.

The carbureter includes a tank 10 which is connected to a suitable supply reservoir 11 by a pipe 12, and connected in the pipe is a valve casing 13, in which is arranged a valve 14 connected to and under the control of a float 15, in order to maintain a constant level of gasolene or other liquid carbureting agent within the tank.

A part of the lower portion of the tank is divided off by suitable partitions to form a closed chamber 16, from the top of which leads a pipe 17 through which the air or gas to be carbureted is forced, any liquid which the air or fluid may carry being deposited in the chamber 16, and withdrawn from time to time through a pet cock 18. Extending from the top of the chamber 16 is a pipe 19, having approximately semi-circular branches 20, each of which is forked to form discharge pipes 21, the lower ends of which are arranged some distance below the level of the gasolene or other hydro carbon, so that the air or gas under pressure passing from the chamber 16 will be delivered at a point below the level of the carbureting liquid, and in bubbling up through the same will become thoroughly saturated.

Over the air pipes 20—21 is arranged a bell shaped shield 23 that is formed of some absorbent material, such, for instance, as burlap, this material being held in shape by suitable ribs or the like, and the lower edges of the shield are immersed in liquid hydro carbon. The shield is preferably suspended from the top of the tank by a light spring 24, and at a number of points, the sides of said shield are connected to a stationary part of the apparatus by very light tension springs 25, the object being to so mount the shield as to permit free movement in all directions under the influence of the currents of air rising from the carbureting fluid, it being found that the bell or shield will be kept in a constant state of agitation so long as aeriform fluid is being forced through the pipe 17.

Suspended from and carried by the inner surface of the bell shaped shield are absorbent members 27 which may take the form of sponges, wicking or the like, and these are preferably hung from light helical springs 28 in such manner that when the bell or shield is in a state of rest, the absorbent members will be partly immersed in the hydro-carbon.

In operation, the air or gas is forced through the pipe 17 to the chamber 16, where any moisture that it may carry is deposited. The fluid then passes up through the pipe 19 and is discharged through the branches 21 at a point some distance below the level of the hydro carbon. The air bubbles up through the hydro carbon to the surface, and in passing upward strikes against the bell shaped shield, the latter being violently agitated and causing the absorbent members to rise and fall to a greater or less extent, so that there will be more or less splashing of the hydro carbon and the absorbent members will be alternately immersed and saturated, and then raised to a point above the level of the hydro carbon in the path of the out flowing currents of air, so that the air will become thoroughly saturated. The carbureted air or gas finally passes off through a discharge pipe 30 to a point of consumption, any suitable filtering or straining medium being interposed for the purpose of removing excess moisture.

The air is in a measure confined within the shield and must pass through the same before finally escaping. Inasmuch as the shield is formed of absorbent material and is in a state of constant agitation, it will be more or less saturated with the liquid hydro carbon, and at the same time the interior space of the bell will be filled with a spray resulting from the violent agitation of the suspended sponges or other free absorbent members 27.

As a modification of the invention, the shield may be formed of metal or the like and provided with a circular piece of wicking, as indicated at 31 in Fig. 4, so hung from the top portion of the shield that an inclosed casing will be formed into which all of the air will pass and as the absorbent member is agitated, it will become thoroughly saturated and the air passing therethrough will carry off sufficient carbon for the purpose desired.

I claim:—

1. In a carbureter, a containing casing for the hydro-carbon, means for discharging air below the level of the hydro-carbon, an absorbent member, a carrier therefor, said carrier being arranged in the path of the flow of the fluid to be carbureted, and being agitated by such fluid, and yieldable supporting means on which said carrier is free to move in all directions.

2. In a carbureter, a containing casing for the hydro-carbon, means for discharging air below the level of the hydro-carbon, and a yieldably suspended absorbent member free to move in all directions and arranged to be agitated by the passage of the fluid to be carbureted.

3. In a carbureter, a hydro-carbon containing casing, means for discharging air below the level of the hydro-carbon, an absorbent member, and a spring supported carrier from which said member is yieldingly suspended, the carrier being disposed in the path of the current of fluid to be carbureted.

4. In a carbureter, a hydro-carbon containing casing, means for discharging air below the level of the hydro-carbon, a yieldingly suspended carrier arranged therein and arranged to be subjected to the action of the flow of fluid to be carbureted, and an absorbent member supported by the carrier.

5. In a carbureter, a hydro-carbon containing casing, an air pipe leading therein and arranged to discharge air at a point below the level of the hydro-carbon, an absorbent shield suspended over the body of hydro-carbon and having its lower edge immersed therein, and a freely yieldable shield support arranged to permit movement of said shield in all directions.

6. In a carbureter, a hydro-carbon containing casing, an air pipe leading thereinto and having downturned branches arranged to discharge the air at a point below the level of the hydro-carbon, a bell-shaped shield suspended over the hydro-carbon, and arranged to be agitated by the passage of the air, a spring serving as a support for the shield, auxiliary springs connecting the edge portion of the shield to the casing, a plurality of springs carried by the shield, and absorbent members supported by said springs.

7. In a carbureter, a hydro-carbon containing casing, an absorbent member in the form of a shield yieldably suspended within the carbureter casing, a shield supporting means arranged to permit movement of the shield in all directions, and means for discharging air within such shield below the level of the hydro-carbon.

8. In a carbureter, a hydro-carbon containing casing, and an absorbent member in the form of a bell, the lower edge of which is constantly immersed in the hydro-carbon, and means for discharging the air within the bell at a point below the level of the hydro-carbon to keep the same in a constant state of agitation.

In testimony that I claim the foregoing as my own, I have hereto affixed my signature in the presence of two witnesses.

THOMAS E. PUDDINGTON.

Witnesses:
JAMES MINOT,
WILLIAM E. DOW.